(12) United States Patent
Zhang et al.

(10) Patent No.: US 11,914,648 B2
(45) Date of Patent: Feb. 27, 2024

(54) GRAPH REFACTORIZATION METHOD AND GRAPH REFACTORIZATION APPARATUS

(71) Applicant: HUAWEI TECHNOLOGIES CO., LTD., Guangdong (CN)

(72) Inventors: Chaorui Zhang, Shenzhen (CN); Wei Han, Shenzhen (CN); Bo Bai, Hong Kong (CN); Gong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 17/667,302

(22) Filed: Feb. 8, 2022

(65) Prior Publication Data

US 2022/0156324 A1 May 19, 2022

Related U.S. Application Data

(63) Continuation of application No. PCT/CN2020/107980, filed on Aug. 7, 2020.

(30) Foreign Application Priority Data

Aug. 13, 2019 (CN) .......................... 201910745534.X

(51) Int. Cl.
*G06F 16/901* (2019.01)
(52) U.S. Cl.
CPC ................. *G06F 16/9024* (2019.01)
(58) Field of Classification Search
None
See application file for complete search history.

(56) References Cited

U.S. PATENT DOCUMENTS 9,734,607 B2 * 8/2017 Macko ................ G06F 16/9024
10,810,210 B2 * 10/2020 Choudhury ......... G06F 16/2379
(Continued)

FOREIGN PATENT DOCUMENTS

| CN | 103699606 A | 4/2014 |
| CN | 108804226 A | 11/2018 |
| CN | 109033191 A | 12/2018 |

OTHER PUBLICATIONS

R. Chen, J. Shi, Y. Chen, and H. Chen. Powerlyra: Differentiated graph computation and partitioning on skewed graphs. In Proceedings of the Tenth European Conference on Computer Systems (EuroSys), pp. 1-15, 2015.
(Continued)

*Primary Examiner* — Kim T Nguyen
(74) *Attorney, Agent, or Firm* — HUAWEI TECHNOLOGIES CO., LTD.

(57) ABSTRACT

A graph refactorization method is provided, and relate to the field of communication technologies, to implement parallel graph processing with load balancing, low communication costs, and short execution time. The method includes: A first machine selects a first vertex from a local vertex set of a subgraph (S801). If a degree of the first vertex is less than or equal to a first preset threshold, the first machine fuses the first vertex and an adjacent vertex within a preset quantity of hops of the first vertex in the local vertex set into a super-vertex (S802). If the degree of the first vertex is greater than or equal to a second preset threshold, the first machine copies the first vertex to obtain N sub-vertices, and divides edges of the first vertex in the subgraph of the first machine into N parts to respectively connect to the N sub-vertices (S803).

15 Claims, 14 Drawing Sheets

(56) References Cited

U.S. PATENT DOCUMENTS

| | | | |
|---|---|---|---|
| 2016/0071233 A1* | 3/2016 | Macko | G06T 11/206 345/440 |
| 2017/0068746 A1 | 3/2017 | Levin et al. | |
| 2017/0091342 A1 | 3/2017 | Sun et al. | |
| 2022/0147795 A1* | 5/2022 | Chu | G06N 3/04 |
| 2022/0156324 A1* | 5/2022 | Zhang | G06F 16/9024 |

OTHER PUBLICATIONS

TopoX: Topology Refactorization for Efficient Graph Partitioning and Processing, in 45th International Conference on Very Large Data Bases (VLDB) 2019, 15 pages.

Gonzalez, J.E., Low, Y., Gu, H., Bickson, D. and Guestrin, C. Powergraph: Distributed graph-parallel computation on natural graphs. In Proceedings of the 10th USENIX Symposium on Operating Systems Design and Implementation (OSDI), pp. 17-30, 2012.

Malewicz, Grzegorz, Matthew H. Austern, Aart JC Bik, James C. Dehnert, Illan Horn, Naty Leiser, and Grzegorz Czajkowski. Pregel: a system for large-scale graph processing. In Proceedings of the 2010 ACM SIGMOD International Conference on Management of data, pp. 135-146, 2010.

Gonzalez, J.E., Low, Y., Guestrin, C. and O"Hallaron, D. Distributed parallel inference on large factor graphs. In Proceedings of the Twenty-Fifth Conference on Uncertainty in Artificial Intelligence, pp. 203-212. AUAI Press, 2009.

Karypis, G. and Kumar, V. METIS—unstructured graph partitioning and sparse matrix ordering system, version 2.0. 1995, 17 pages.

Zhu, X., Chen, W., Zheng, W. and Ma, X., 2016. Gemini: A computation-centric distributed graph processing system. In 12th {USENIX} Symposium on Operating Systems Design and Implementation ({OSDI} 16) (pp. 301-316).

\* cited by examiner

GRAPH REFACTORIZATION METHOD AND GRAPH REFACTORIZATION APPARATUS

CROSS-REFERENCE TO RELATED APPLICATIONS

This application is a continuation of International Application No. PCT/CN2020/107980, filed on Aug. 7, 2020, which claims priority to Chinese Patent Application No. 201910745534.X, filed on Aug. 13, 2019. The disclosures of the aforementioned applications are hereby incorporated by reference in their entireties.

TECHNICAL FIELD

Embodiments of this disclosure relate to the field of communication technologies, and in particular, to a graph refactorization method and a graph refactorization apparatus.

BACKGROUND

Data generated by interaction between things is referred to as graph structure data. The graph structure data includes vertices (also referred to as nodes) and edges. Different things are different vertices, and a connection between two vertices is referred to as an edge. A quantity of edges that connect a vertex to another vertex is referred to a degree of the vertex. Graph processing is a process of studying and analyzing relationships between things in an objective world based on graph structure data.

In recent years, with rapid development of the Internet, the world has entered the age of big data. Then a huge amount of graph structure data is generated. As a quantity of vertices increases, a scale of a graph also increases, graph processing often cannot be performed by using only one computer (also referred to as a machine). A parallel graph processing system performs graph processing together through coordinated communication between a plurality of computers, to reduce a computation load of each computer. In the parallel graph processing system, a graph partitioning (Graph Partitioning) technology is very important to balance a computation load and reduce communication costs.

Current graph partitioning technologies are edge-cut, vertex-cut, and hybrid-cut. Edge-cut is vertex-centric, and is to equally divide vertices to all machines. Although the graph partitioning technology reduces costs of coordinated communication between machines, it is difficult to guarantee balanced load allocation. Because execution time of a graph processing algorithm depends on a machine that finally completes computation, the graph partitioning technology increases the execution time of the graph processing algorithm. Vertex-cut is to evenly allocate edges in a graph to all machines, to ensure that computation loads of the machines are similar. Although the graph partitioning technology guarantees balanced load allocation, a low-degree vertex that originally can be processed by a single machine is forcibly split and copied to a plurality of machines due to lack of global information, increasing costs of coordinated communication between machines, and increasing the execution time of the graph processing algorithm. In hybrid-cut, a vertex-cut principle is used for a high-degree vertex, and an edge-cut principle is used for a low-degree vertex. In this way, a balanced load can be allocated to each machine, and costs of communication between machines are also reduced. However, to use different partitioning functions for different vertices, higher coordination costs are needed, and each machine needs to read more graph information. Therefore, the graph partitioning technology has limited performance in shortening of the execution time of the graph processing algorithm.

Therefore, how to shorten the execution time of the graph processing algorithm is an urgent problem to be solved in the parallel graph processing system on the premise of balancing the load and reducing the costs of communication between machines.

SUMMARY

This disclosure provides a graph refactorization method and a graph refactorization apparatus, to implement parallel graph processing with load balancing, low communication costs, and short execution time.

According to a first aspect, an embodiment of this disclosure provides a graph refactorization method. The method may include: A first machine selects a first vertex from a local vertex set of a subgraph, where the local vertex set includes all unrefactored vertices in the subgraph of the first machine, and the first vertex is any vertex in the local vertex set. If a degree of the first vertex is less than or equal to a first preset threshold, the first machine fuses the first vertex and an adjacent vertex within a preset quantity of hops of the first vertex in the local vertex set into a super-vertex. If the degree of the first vertex is greater than or equal to a second preset threshold, the first machine copies the first vertex to obtain N sub-vertices, and divides edges of the first vertex in the subgraph of the first machine into N parts to respectively connect to the N sub-vertices, where N is less than or equal to a total quantity of machines included in a graph processing system to which the first machine belongs.

According to the graph refactorization method provided in this disclosure, based on degrees of vertices in a subgraph of a machine, a low-degree vertex is fused, and a high-degree vertex is split, to ensure that degrees in a graph obtained after refactorization are equivalent on the premise of retaining an original topological structure of graph structure data. In this way, graph partitioning is performed on the graph obtained after refactorization during parallel graph processing. While a computation load allocated to each machine is balanced, because the original topological structure is retained, there is no need for excessive communication between different machines. In this way, execution time of subsequent graph processing is shortened.

All the unrefactored vertices are vertices that are not fused or split in all machines (including but not limited to the first machine) in the graph processing system.

It should be noted that the first machine may traverse all vertices in the subgraph of the first machine by using the graph refactorization method provided in this disclosure, to complete subgraph refactorization of the first machine. The first machine may be any machine in the graph processing system. This is not specifically limited in this disclosure.

With reference to the first aspect, in an optional implementation, if the first machine fuses the first vertex and the adjacent vertex within the preset quantity of hops of the first vertex in the local vertex set into the super-vertex, the graph refactorization method provided in this disclosure may further include: The first machine respectively sends a fusion indication to each machine including the first vertex in the graph processing system, to mark that the first machine has performed a fusion operation on the first vertex, to avoid a fusion operation performed by another machine on the first vertex, so as to effectively avoid a conflict.

With reference to any one of the first aspect or the possible implementations of the first aspect, in an optional implementation, if the first machine fuses the first vertex and the adjacent vertex within the preset quantity of hops of the first vertex in the local vertex set into the super-vertex, the graph refactorization method provided in this disclosure may further include: The first machine respectively sends a fusion indication to each machine including a vertex in the super-vertex in the graph processing system, to mark that the first machine has performed a fusion operation on the vertex in the super-vertex, to effectively avoid a conflict.

With reference to any one of the first aspect or the possible implementations of the first aspect, in another possible implementation, if the first machine copies the first vertex to obtain N sub-vertices, and divides the edges of the first vertex in the subgraph into N parts to respectively connect to the N sub-vertices, the graph refactorization method provided in this disclosure may further include: The first machine respectively sends a splitting indication to each machine including the first vertex in the graph processing system, to mark that the first machine has performed a splitting operation on the first vertex, to avoid a fusion operation performed by another machine on the first vertex, so as to effectively avoid a conflict.

With reference to any one of the first aspect or the possible implementations of the first aspect, in another possible implementation, if the degree of the first vertex is greater than or equal to the second preset threshold, the graph refactorization method provided in this disclosure may further include: The first machine respectively sends a splitting indication to another machine in the graph processing system, to mark that the first machine has performed a splitting operation on the first vertex, to notify another machine in the graph processing system to participate in computation of the first vertex.

With reference to any one of the first aspect or the possible implementations of the first aspect, in another possible implementation, the first preset threshold may be less than the second preset threshold, to implement that a vertex whose quantity of degrees is ranked in the middle in the subgraph may not be refactored, thereby improving refactorization efficiency.

With reference to any one of the first aspect or the possible implementations of the first aspect, in another possible implementation, the first preset threshold may be equal to the second preset threshold, to implement that all vertices in the subgraph are refactored, thereby enhancing a refactorization effect.

With reference to any one of the first aspect or the possible implementations of the first aspect, in another possible implementation, the graph refactorization method provided in this disclosure may further include: The first machine performs graph partitioning on a subgraph obtained after refactorization; and the first machine performs graph processing on a computation load allocated to the first machine, to complete parallel graph processing. The graph partitioning method and the graph processing method are not specifically limited in this disclosure.

With reference to any one of the first aspect or the possible implementations of the first aspect, in another possible implementation, that the first machine performs graph partitioning on the subgraph obtained after refactorization may be specifically implemented as: The first machine allocates the refactored super-vertex and an edge of the super-vertex to a machine having a smallest load in the graph processing system as a computation load. Alternatively, the first machine allocates a sub-vertex and an edge of the sub-vertex to the first machine as a computation load, and the first machine respectively allocates N−1 sub-vertices other than the sub-vertex and edges of the N−1 sub-vertices to N−1 machines other than the first machine in the graph processing system as computation loads, to implement partitioning while refactorization, thereby improving graph processing efficiency and effectively shortening execution time of graph processing.

With reference to any one of the first aspect or the possible implementations of the first aspect, in another possible implementation, that the first machine performs graph partitioning on the subgraph obtained after refactorization may be specifically implemented as: The first machine performs edge-cut, vertex-cut, or hybrid-cut on the subgraph obtained after refactorization.

With reference to any one of the first aspect or the possible implementations of the first aspect, in another possible implementation, that the first machine performs graph processing on the computation load allocated to the first machine includes: The first machine performs delta-based graph processing on the computation load allocated to the first machine, thereby improving computation efficiency and shortening execution time.

With reference to any one of the first aspect or the possible implementations of the first aspect, in another possible implementation, the dividing edges of the first vertex in the subgraph into N parts may be specifically implemented as: if a quantity of edges of the first vertex in the subgraph is an integer multiple of N, equally dividing the edges of the first vertex into N parts; and if the quantity of edges of the first vertex in the subgraph is not an integer multiple of N, dividing the edges of the first vertex into N parts, where a quantity of edges of each part is an integer, and a difference between quantities of edges of every two parts is the smallest, to achieve equal division as much as possible.

According to a second aspect, an embodiment of this disclosure provides a graph refactorization apparatus. The apparatus may include a selection unit, a fusion unit, and a splitting unit. The selection unit is configured to select a first vertex from a local vertex set of a subgraph, where the local vertex set includes all unrefactored vertices in the subgraph, and the first vertex is any vertex in the local vertex set. The fusion unit is configured to: if a degree of the first vertex is less than or equal to a first preset threshold, fuse the first vertex and an adjacent vertex within a preset quantity of hops of the first vertex in the local vertex set into a super-vertex. The splitting unit is configured to: if the degree of the first vertex is greater than or equal to a second preset threshold, copy the first vertex to obtain N sub-vertices, and divide edges of the first vertex in the subgraph into N parts to respectively connect to the N sub-vertices, where N is less than or equal to a total quantity of machines included in a graph processing system to which the apparatus belongs.

According to the graph refactorization apparatus provided in this disclosure, based on degrees of vertices in a subgraph of a machine, a low-degree vertex is fused, and a high-degree vertex is split, to ensure that degrees in a graph obtained after refactorization are equivalent on the premise of retaining an original topological structure of graph structure data. In this way, graph partitioning is performed on the graph obtained after refactorization during parallel graph processing. While a computation load allocated to each machine is balanced, because the original topological structure is retained, there is no need for excessive communication between different machines. In this way, execution time of subsequent graph processing is shortened.

It should be noted that the graph refactorization apparatus provided in the second aspect of this disclosure is used to implement the graph refactorization method provided in any one of the first aspect or the possible implementations of the first aspect. Therefore, for specific implementations of the graph refactorization apparatus provided in the second aspect of this disclosure, refer to the specific implementations of the graph refactorization method provided in any one of the first aspect or the possible implementations of the first aspect. Details are not described herein.

According to a third aspect, an embodiment of this disclosure provides a graph refactorization apparatus. The graph refactorization apparatus may implement functions of the first machine in the foregoing method examples. The functions may be implemented by using hardware or by hardware by executing corresponding software. The hardware or the software includes one or more modules corresponding to the foregoing functions. The graph refactorization apparatus may exist in a product form of a chip.

With reference to the third aspect, in an optional implementation, a structure of the graph refactorization apparatus includes a processor and a transceiver. The processor is configured to support the graph refactorization apparatus in executing the corresponding functions in the foregoing method. The transceiver is configured to support the graph refactorization apparatus in communicating with another device. The graph refactorization apparatus may further include a memory. The memory is configured to couple to the processor and stores program instructions and data necessary for the graph refactorization apparatus.

According to a fourth aspect, an embodiment of this disclosure provides a machine. The machine includes a graph refactorization apparatus for performing the graph refactorization method provided in any one of the first aspect or the possible implementations of the first aspect.

According to a fifth aspect, an embodiment of this disclosure provides a graph processing system, including two or more of the machines provided in the fourth aspect.

According to a sixth aspect, an embodiment of this disclosure provides a computer readable storage medium, including instructions. When the instructions are run on a computer, the computer is enabled to perform the graph refactorization method provided in any one of the aspects or the possible implementations of the aspects.

According to a seventh aspect, an embodiment of this disclosure provides a computer program product including instructions. When the computer program product is run on a computer, the computer is enabled to perform the graph refactorization method provided in any one of the aspects or the possible implementations of the aspects.

It should be noted that various possible implementations of any one of the foregoing aspects may be combined provided that the solutions are not contradictory.

DESCRIPTION OF EMBODIMENTS

In this specification, claims, and accompanying drawings of this disclosure, the terms "first", "second", "third", and the like are intended to distinguish between different objects but do not limit a particular order.

In the embodiments of this disclosure, the word "example" or "for example" is used to represent giving an example, an illustration, or a description. Any embodiment or design scheme described as an "example" or "for example" in the embodiments of this disclosure shall not be explained as being more preferred or having more advantages than another embodiment or design scheme. Exactly, use of the term such as "example" or "for example" is intended to present a related concept in a specific manner.

For clear and concise description of the following embodiments, nouns and related technologies in this specification are briefly described herein.

A graph is a data structure, also referred to as graph structure data, describes data generated by interaction between things. The graph structure data includes vertices and edges. Different things are different vertices, and two things interact to generate corresponding edges. A typical piece of graph structure data comes from a social network, each individual in the social network is a vertex, and connections between individuals form edges. Application scenarios of the graph structure data may further include but are not limited to: community detection, shopping recommendation, exception analysis, page ranking, protein molecular analysis, and the like.

A vertex (Vertex), also referred to as a node, is a thing in the graph structure data.

A degree is an attribute of a vertex and is a quantity of edges connected to the vertex.

Graph processing is an algorithm of analyzing and studying graph structure data, to obtain relationships between things in an objective world. A processing object of graph processing is the graph structure data. For example, in a social network, a purpose of graph processing is to define closeness of relationships between individuals or to determine the concept of group within individuals. Application scenarios of graph processing may include but are not limited to: social media (community detection), advertisement recommendation (shopping recommendation), a knowledge graph (exception analysis), the Internet (page ranking), computational biology (protein molecular analysis), and the like.

A machine, also referred to as a computer or a computing machine, is a device that is configured to perform graph processing in a graph processing system.

Figure 1:
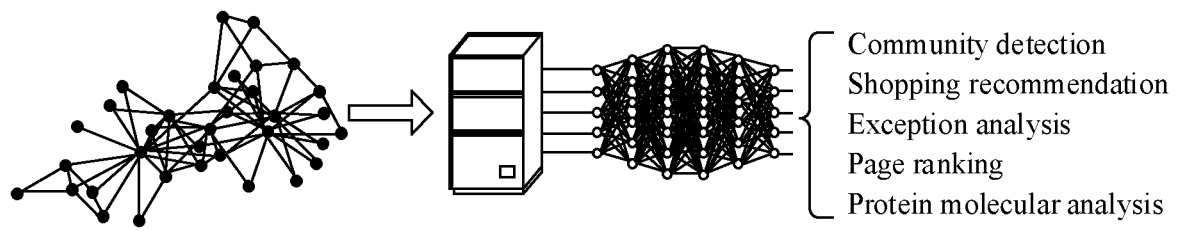
FIG. 1 is a schematic diagram of a structure of a graph processing framework.

FIG. 1 shows a basic graph processing framework. As shown in FIG. 1, graph structure data is input, graph processing (a machine learning, data mining, or deep learning algorithm) is performed, and a result of a relationship between vertices is output for subsequent specific applications.

With an increasing quantity of vertices in the graph structure data, a graph scale becomes larger. A parallel graph processing system completes graph processing through coordinated communication among a plurality of computers. In the parallel graph processing system, graph partitioning needs to be performed before graph processing. A graph partitioning technology is first briefly described herein.

Figure 2:
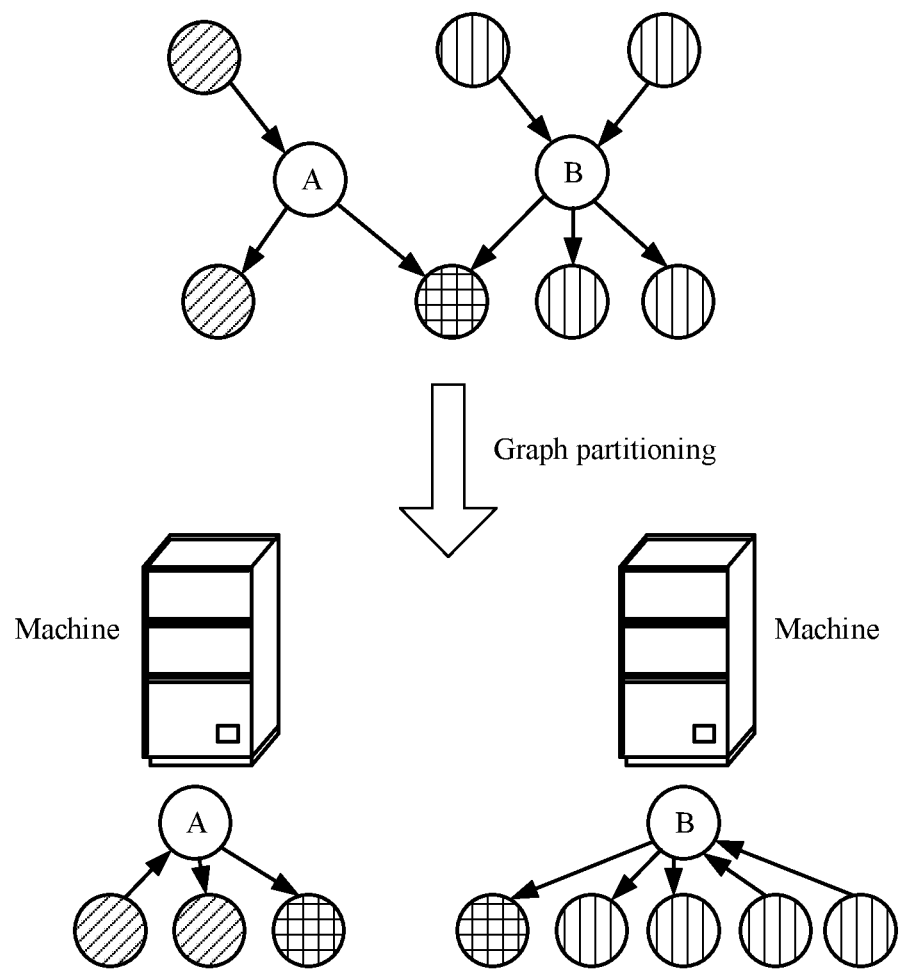
FIG. 2 is a schematic diagram of a scenario of edge-cut-based graph partitioning.

One graph partitioning technology is based on an edge-cut (Edge-Cut) principle during graph partitioning, is vertex-centric, and is to equally divide vertices to all machines. FIG. 2 shows a scenario of edge-cut-based graph partitioning. As shown in FIG. 2, if edge-cut-based graph partitioning is used, a vertex A and adjacent information of a vertex connected to the vertex A are allocated to a same machine, and a vertex B and adjacent information of a vertex connected to the vertex B are allocated to a same machine. Due to consistency of partitioning functions, an advantage of this technology is to reduce costs of coordinated communication between machines. However, in this technology, it is difficult to guarantee balanced load allocation, and as can be seen from FIG. 2, when adjacent information of vertices is unbalanced, a machine to which a low-degree vertex (the vertex A) is allocated has a lower computation load. A machine to which a high-degree vertex (the vertex B) is allocated has higher computation load. Execution time of a graph processing algorithm depends on a machine that finally completes computation. Therefore, the execution time of the graph processing algorithm is increased.

Figure 3:
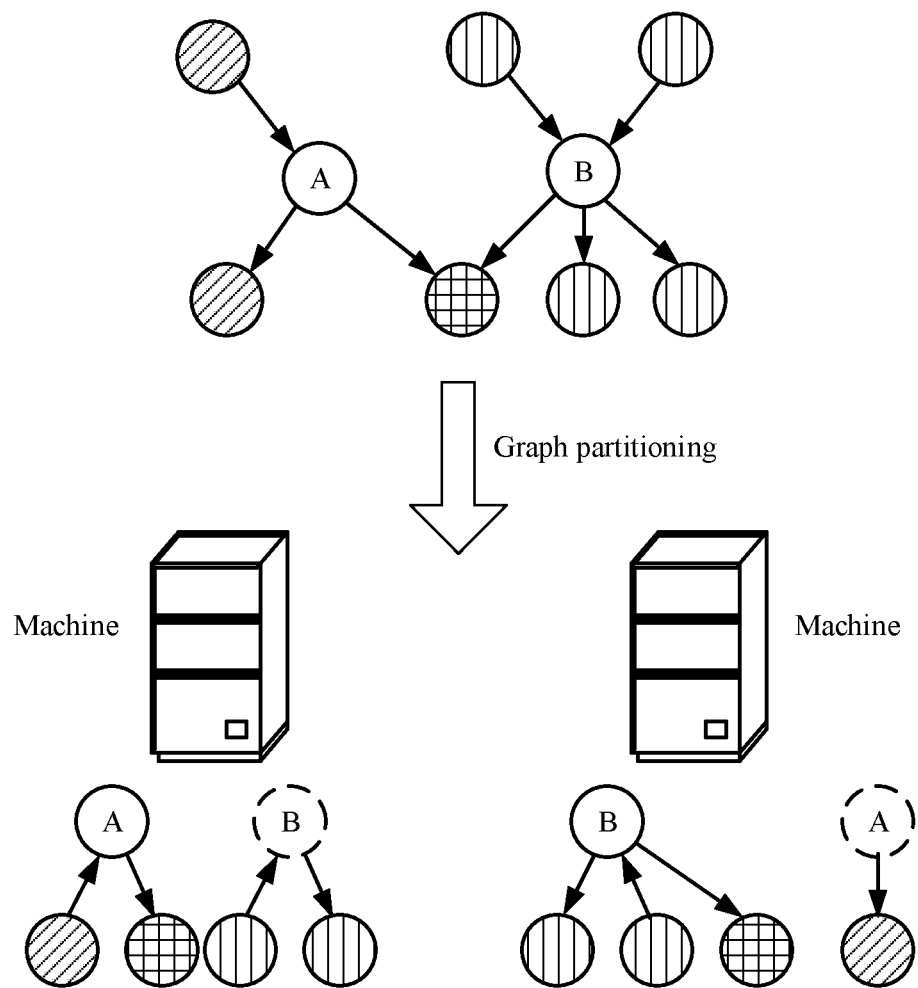
FIG. 3 is a schematic diagram of a scenario of vertex-cut-based graph partitioning.

Another graph partitioning technology is based on a vertex-cut principle during graph partitioning, and is to mainly evenly divide edges. Edges in a graph are evenly allocated to all machines, to ensure that computation loads of all the machines are similar. An advantage of this technology is to guarantee balanced load allocation. FIG. 3 shows a scenario of vertex-cut-based graph partitioning. As shown in FIG. 3, edges of a vertex A and a vertex B are evenly allocated, and the vertex A and the vertex B are copied to a plurality of machines. In this technology, after graph partitioning, although subgraphs obtained after partitioning are more balanced, costs of coordinated communication between machines are increased. A low-degree vertex (the vertex A) that originally can be processed by a single machine is forcibly split and copied to a plurality of machines due to lack of global information, and the machines update graph processing information in a coordinated manner, increasing costs of coordinated communication between machines, and increasing the execution time of the graph processing algorithm.

Figure 4:
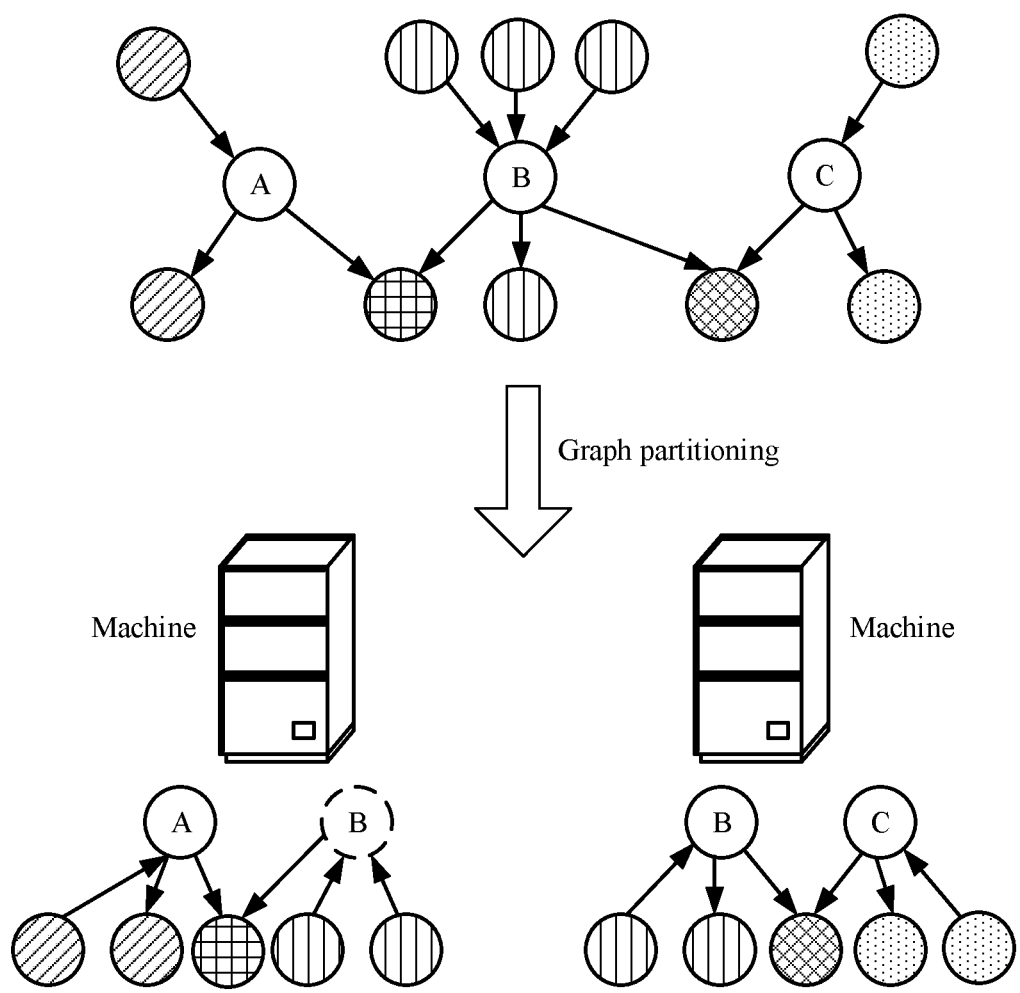
FIG. 4 is a schematic diagram of a scenario of hybrid-cut-based graph partitioning.

Still another graph partitioning technology combines the advantages of the above two graph partitioning technologies. In this technology, during graph partitioning, a vertex-cut principle is used for a high-degree vertex, and an edge-cut principle is used for a low-degree vertex. FIG. 4 shows a scenario of hybrid-cut-based graph partitioning. As shown in FIG. 4, vertex-cut is used for a vertex A and a vertex C, and edge-cut is used for a vertex B. According to this technology, a balanced load can be allocated to each machine, and costs of communication between machines are also reduced. However, in this technology, to use different partitioning functions for different vertices, higher coordination costs are needed, and performance in shortening of the execution time of the graph processing algorithm is limited.

Figure 5:
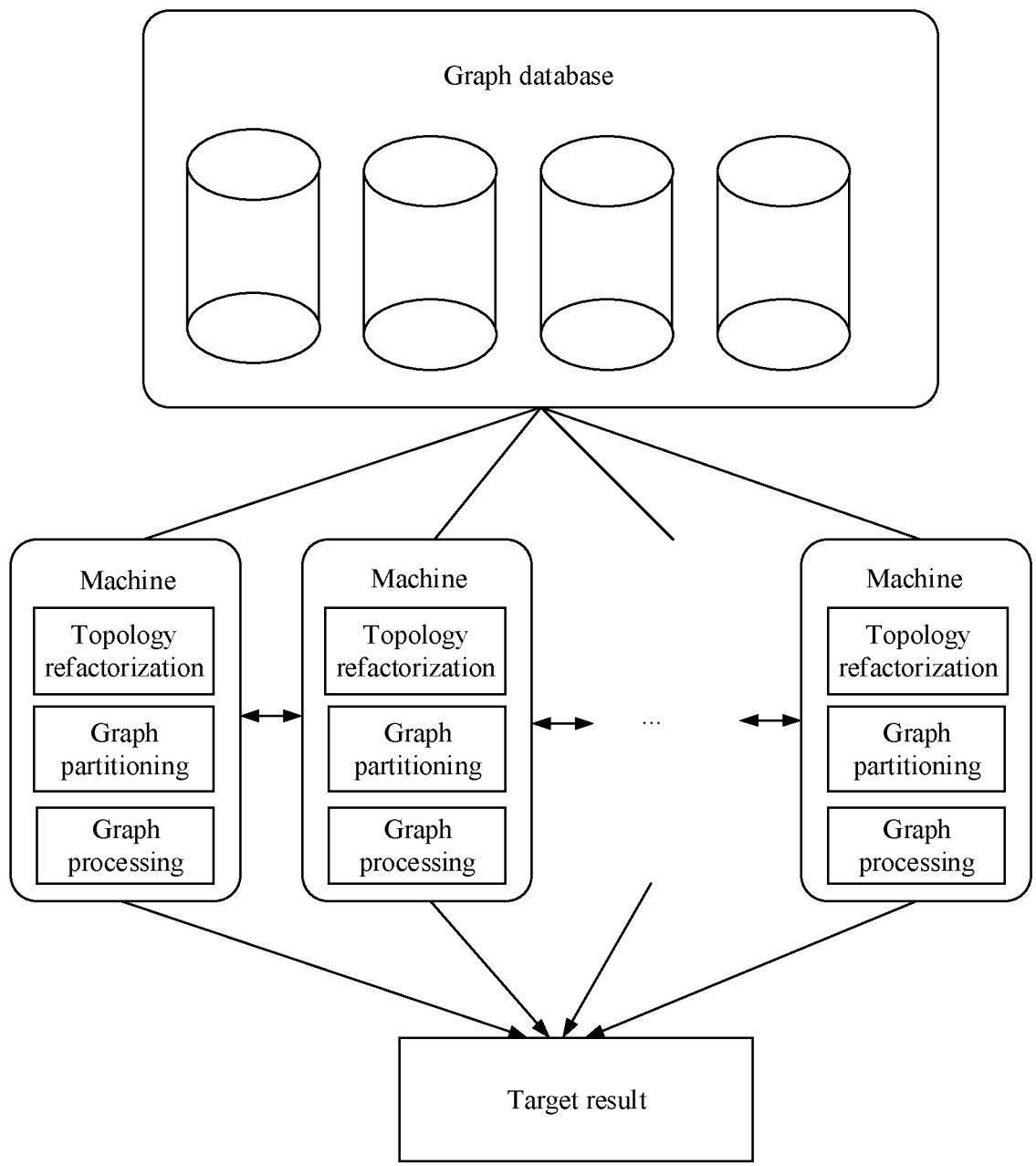
FIG. 5 is a schematic diagram of a structure of a graph processing system.

The graph refactorization method provided in this disclosure may be applied to a graph processing system shown in FIG. 5. As shown in FIG. 5, the graph processing system includes a graph database and a plurality of machines. Each machine reads a subgraph of the machine from the graph database, and performs graph refactorization, graph partitioning, and graph processing, to obtain a target result.

It should be noted that FIG. 5 merely shows an architecture of a graph processing system. In an actual application, a scale of a graph processing system to which the solutions of this disclosure are applied may be configured based on an actual situation. This is not specifically limited in this embodiment of this disclosure.

It should be noted that, actual product forms of network elements in the accompanying drawings of this disclosure may be configured based on an actual requirement. The accompanying drawings merely show types of the network elements by way of example, but do not specifically limit the types of the network elements.

For example, the graph processing system shown in FIG. 5 may be used in major cloud servers, and provides a graph engine service for scenarios with rich relationship data, such as social relationship analysis, recommendations, precision marketing, public opinions and social listening, information communication, and anti-fraud. In addition, the graph processing system shown in FIG. 5 may also be deployed in a fifth generation (5G) mobile communication network edge computing device, and serves a 5G service scenario that needs graph processing. For example, the graph processing system shown in FIG. 5 may be briefly referred to as a topology-refactorization-based efficient graph partitioning processing system (TopoX).

The following describes the embodiments of this disclosure in detail with reference to the accompanying drawings.

Figure 6:
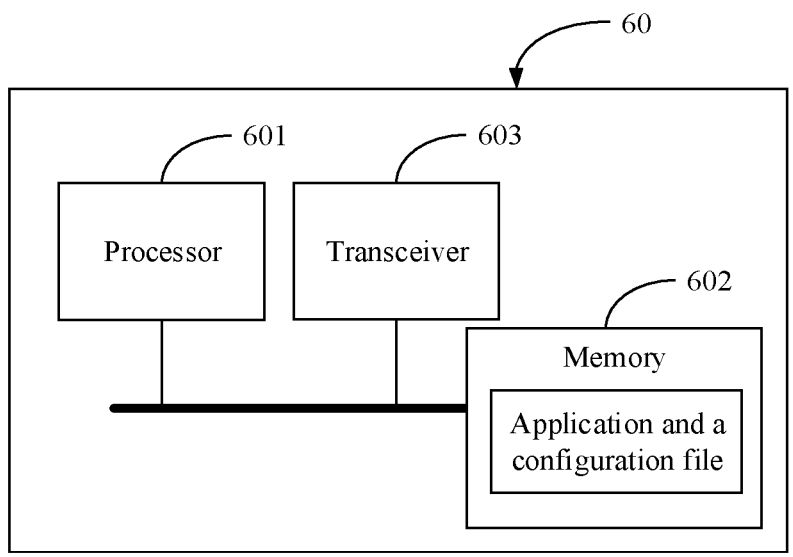
FIG. 6 is a schematic diagram of a structure of a graph refactorization apparatus according to an embodiment of this disclosure.

According to one aspect, an embodiment of this disclosure provides a graph refactorization apparatus, configured to perform a graph refactorization method provided in this disclosure. The graph refactorization apparatus may be deployed on a machine in the graph processing system shown in FIG. 5. FIG. 6 shows a graph refactorization apparatus 60 related to the embodiments of this disclosure.

As shown in FIG. 6, the graph refactorization apparatus 60 may include a processor 601, a memory 602, and a transceiver 603.

Components of the graph refactorization apparatus 60 are specifically described below with reference to FIG. 6.

The memory 602 may be a volatile memory, for example, a random access memory (RAM); or a non-volatile memory, for example, a read-only memory (ROM), a flash memory, a hard disk drive (HDD), or a solid-state drive (SSD); or a combination of the foregoing types of memories, configured to store an application, program code, a configuration file, or other content that can implement the method of this disclosure.

The processor 601 is a control center of the graph refactorization apparatus 60, and may be a central processing unit (CPU), or may be an application-specific integrated circuit (ASIC), or may be one or more integrated circuits configured to implement this embodiment of this disclosure, for example, one or more microprocessors (e.g., digital signal processor, DSP), or one or more field-programmable gate arrays (FPGA).

The transceiver 603 is configured to communicate with another device and transmit data.

Specifically, the processor 601 executes the following functions by running or executing software program stored in the memory 602 and/or modules and invoking data stored in the memory 602:

selecting a first vertex from a local vertex set of a subgraph, where the local vertex set includes all unrefactored vertices in the subgraph of the first machine, and the first vertex is any vertex in the local vertex set; if a degree of the first vertex is less than or equal to a first preset threshold, fusing the first vertex and an adjacent vertex within a preset quantity of hops of the first vertex in the local vertex set into a super-vertex; and if the degree of the first vertex is greater than or equal to a second preset threshold, copying, by the first machine, the first vertex to obtain N sub-vertices, and dividing edges of the first vertex in the subgraph into N parts to respectively connect to the N sub-vertices, where N is less than or equal to a total quantity of machines included in a graph processing system to which the graph refactorization apparatus 60 belongs.

Figure 7:
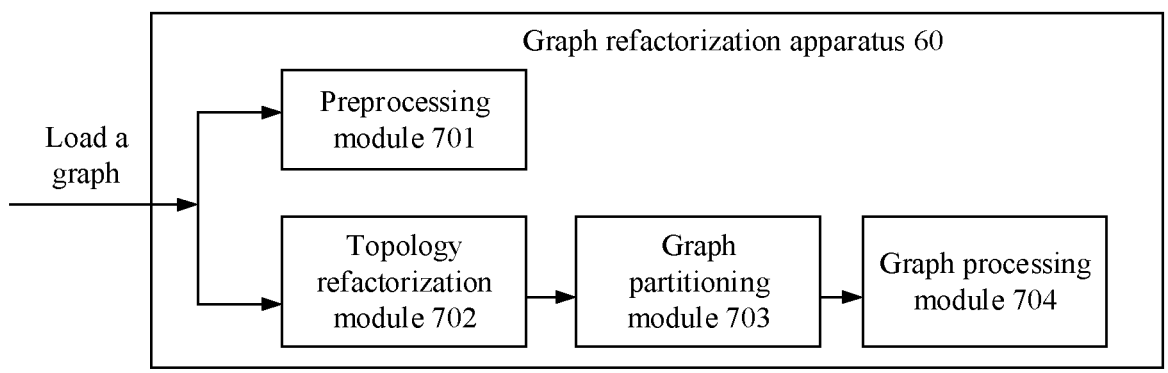
FIG. 7 is a schematic diagram of a structure of another graph refactorization apparatus according to an embodiment of this disclosure.

In an optional implementation, as shown in FIG. 7, the graph refactorization apparatus 60 may include a preprocessing module 701, a topology refactorization module 702, a graph partitioning module 703, and a graph processing module 704.

Specifically, when a machine on which the graph refactorization apparatus 60 is deployed needs to process large-scale graph processing, machines in the graph processing system read different subgraphs in a large graph in parallel and locally store the subgraphs. The preprocessing module 701 performs a preliminary preprocessing operation to obtain local topology information, for example, collecting statistics about degrees of vertices and distinguishing between vertices.

For example, the machine may read partial content of the large graph according to a preset rule, to obtain respective subgraphs. The preset rule may be reading for a quantity of hops in each direction starting from any vertex, or the preset rule may be preconfiguring subgraphs of different machines in the large graph, or the like. A specific solution that the machine reads the subgraphs from the large graph is not specifically limited in this embodiment of this disclosure.

Figure 7A:
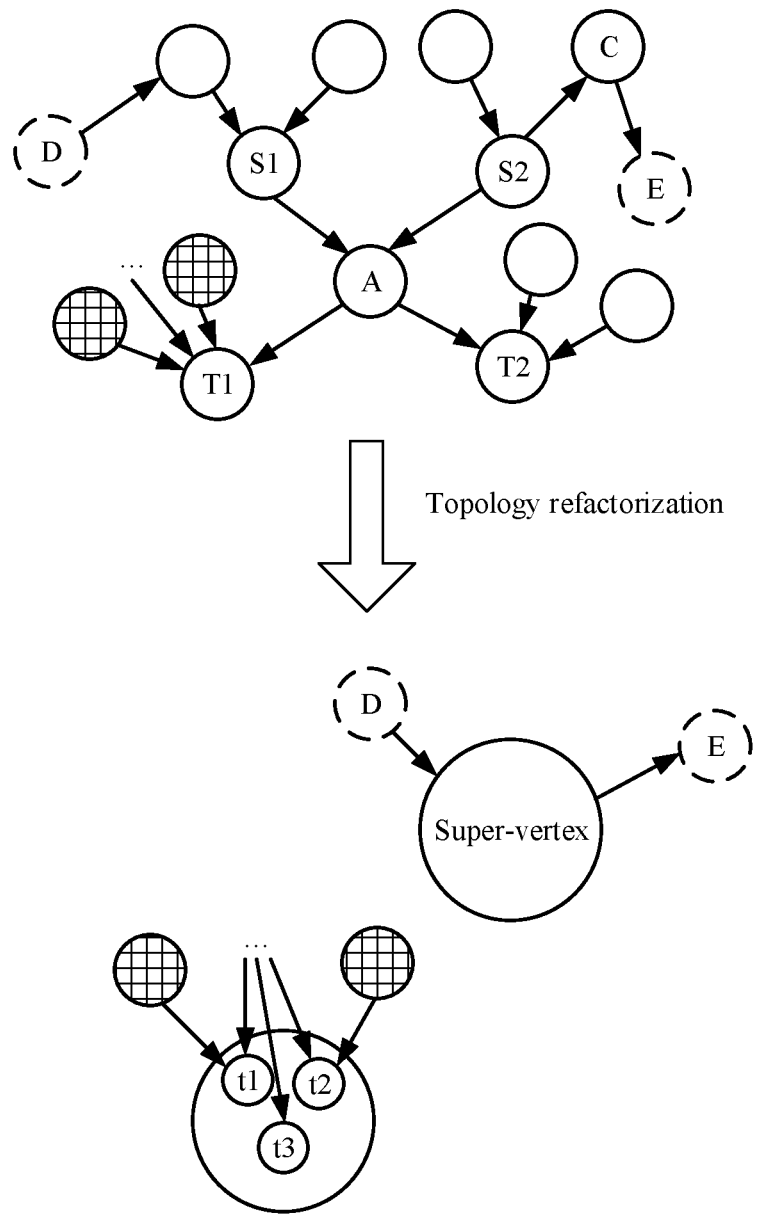
FIG. 7a is a schematic diagram of a topology refactorization scenario according to an embodiment of this disclosure.

The topology refactorization module 702 performs topology refactorization on the read subgraphs based on the information obtained by the preprocessing module 701, performs fusion and splitting operations, and exchanges signaling with a related machine to avoid a potential conflict. As shown in FIG. 7a, the topology refactorization module 702 fuses some low-degree vertices (such as S2) into a super-vertex, and splits a high-degree vertex (such as T1) into sub-vertices.

The graph partitioning module 703 performs graph partitioning on a graph obtained after topology refactorization. The graph partitioning module 703 supports existing graph partitioning methods, such as edge-cut, vertex-cut, or hybrid-cut. The graph partitioning module 703 may further use a more efficient graph partitioning algorithm, such as a hybrid-BL algorithm. The hybrid-BL algorithm is based on a hybrid-cut principle. In the algorithm, a super-vertex and a sub-vertex are directly allocated to a corresponding machine based on load information of a local machine, thereby avoiding global coordination overheads.

The graph processing module 704 may perform, based on a standard gather-apply-scatter (GAS) model, graph processing on a computation load distributed to each machine. Alternatively, the graph processing module 704 may perform, based on a delta-based gather-apply-scatter model (D-GAS), graph processing on a graph satisfying an Abelian group condition. The delta-based D-GAS model only performs delta on a machine (such as a machine 1) whose state is updated. Therefore, communication efficiency is greatly improved.

It should be noted that an architecture of the graph refactorization apparatus 60 shown in FIG. 7 is merely an example, but is not a specific limitation.

Figure 8:
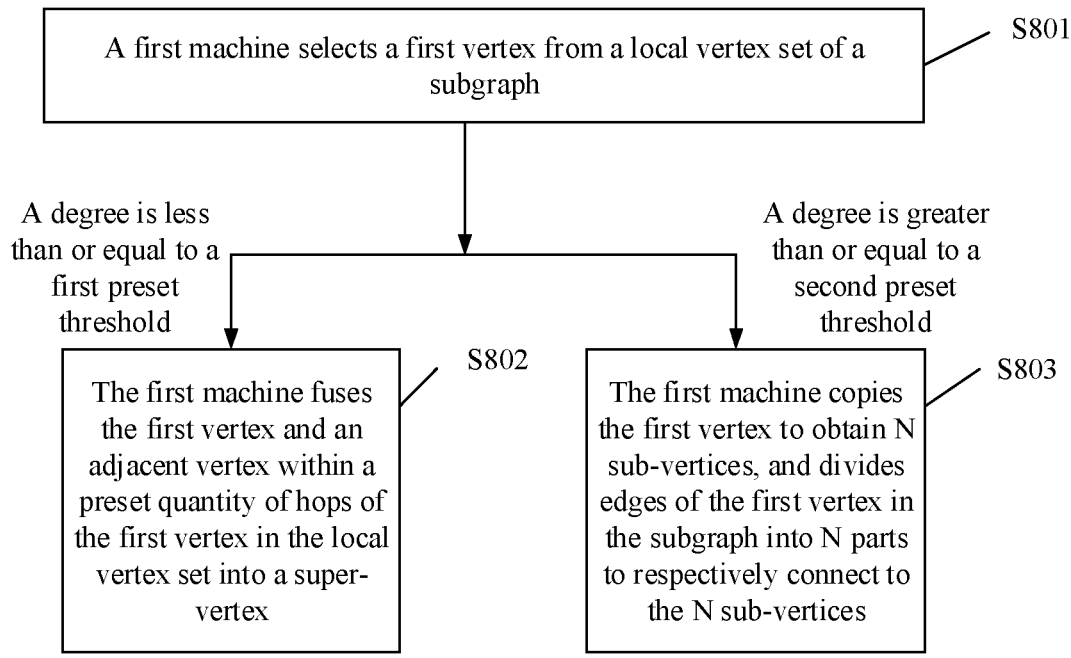
FIG. 8 is a schematic flowchart of a graph refactorization method according to an embodiment of this disclosure.

According to another aspect, an embodiment of this disclosure provides a graph refactorization method. The method may be performed by the graph refactorization apparatus shown in FIG. 6 or FIG. 7. Content of the graph refactorization method performed by each machine in the graph processing system is the same. In this embodiment of this disclosure, only a process in which the first machine performs graph refactorization is used as an example for description. Details are not described one by one. The first machine is any machine in the graph processing system. When a machine on which the graph refactorization apparatus is deployed needs to process large-scale graph processing, machines in the graph processing system read different subgraphs in a large graph in parallel and locally store the subgraphs, perform preprocessing to obtain local topology information of the subgraphs, and then perform the graph refactorization method provided in this disclosure. As shown in FIG. 8, the graph refactorization method provided in this disclosure may include the following steps.

S801: A first machine selects a first vertex from a local vertex set of a subgraph.

The local vertex set includes all unrefactored vertices in the subgraph of the first machine. The first vertex is any vertex in the local vertex set.

Specifically, the unrefactored vertex is a vertex that is not fused or split. Further, the unrefactored vertex is a vertex that is not fused or split by the first machine or another machine.

Optionally, in S801, the first machine may randomly and arbitrarily select the first vertex. Alternatively, the first machine may select the first vertex from the subgraph based on a preset sequence. Certainly, in S801, the first machine may select the first vertex based on another solution. This is not limited in this embodiment of this disclosure.

Further, in S801, after selecting the first vertex, the first machine selects, based on a degree of the first vertex in local topology information, an operation to be performed on the first vertex. Specifically, if the degree of the first vertex is less than or equal to a first preset threshold, S802 is performed. If the degree of the first vertex is greater than or equal to a second preset threshold, S803 is performed.

The first preset threshold may be less than or equal to the second preset threshold. Specific values of the first preset threshold and the second preset threshold may be configured based on an actual requirement. This is not specifically limited in this embodiment of this disclosure.

In an optional implementation, when the first preset threshold is less than the second preset threshold, if the degree of the first vertex is greater than the first preset threshold and less than the second preset threshold, a topology of the first vertex is kept the same, and the first vertex is recorded as refactored and is removed from the local vertex set.

Specifically, the local topology information is used to describe a degree of a vertex in the subgraph. Specifically, the local topology information may be directly a degree of each vertex in the subgraph. Alternatively, the local topology information may include an in-edge table and an out-edge table of each vertex in the subgraph, to indicate a quantity of edges of the vertex. Certainly, specific content of the local topology information is not specifically limited in this embodiment of this disclosure and may be configured based on an actual requirement.

An in-edge table of a vertex is a set of vertices in a subgraph, where directions of edges between the vertices and the vertex point to the vertex. An out-edge table of a vertex is a set of vertices in a subgraph, where directions of edges between the vertices and the vertex point to an opposite end. It should be noted that, for graph structure data without a direction, directions of edges may be configured based on an actual requirement. This is not limited in this embodiment of this disclosure.

Figure 9:
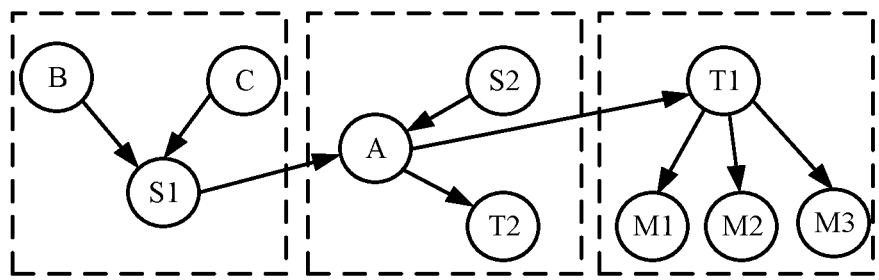
FIG. 9 is a schematic diagram of graph structure data.

For example, in graph structure data shown in FIG. 9, subgraphs of different machines are bounded by dashed lines. As shown in FIG. 9, an in-edge table of a vertex S1 in a leftmost subgraph is {S1:B, C}, and an out-edge table thereof is {S1:A}; an in-edge table of a vertex A in a middle subgraph is {A:S1, S2}, and an out-edge table thereof is {A:T2}; and an in-edge table of a vertex T1 in a rightmost subgraph is {T1:A}, and an out-edge table thereof is {T1: M1, M2, M3}.

S802: The first machine fuses the first vertex and an adjacent vertex within a preset quantity of hops of the first vertex in the local vertex set into a super-vertex.

Fusing into a super-vertex means using a to-be-fused vertex and an edge of the vertex as a whole and considering the whole as one vertex.

Specifically, the first machine may configure a fusion queue, used to store a candidate vertex that is intended to be fused. For example, in S802, the first vertex and the adjacent vertex within the preset quantity of hops of the first vertex in the local vertex set may be added to the fusion queue for fusing.

A value of the preset quantity of hops may be configured based on an actual requirement and is not specifically limited in this embodiment of this disclosure.

In an optional implementation, in S802, the first machine may add the first vertex and an adjacent vertex directly connected to the first vertex to the fusion queue, and then determine that a maximum value of a dimension (that is, a quantity of hops) between each vertex other than the first vertex in the fuse queue and the first vertex is less than the preset quantity of hops. The first machine then searches for an adjacent vertex at a next hop and adds the adjacent vertex at the next hop to the fusion queue until the maximum value of the dimension (that is, the quantity of hops) between each vertex other than the first vertex in the fusion queue and the first vertex is equal to the preset quantity of hops, or a vertex that is furthest from the first vertex in vertices other than the first vertex in the fusion queue is a boundary vertex of the subgraph.

It should be noted that, when S802 is performed, if the quantity of hops between the first vertex in the subgraph of the first machine and the boundary vertex of the subgraph is less than the preset quantity of hops, in S802, the first machine fuses the first vertex and a vertex (including the boundary vertex) between the first vertex in the local vertex set and the boundary vertex of the subgraph into a super-vertex.

Further, after S802 is performed, the local vertex set of the first machine does not include the vertices fused in S802.

Figure 10:
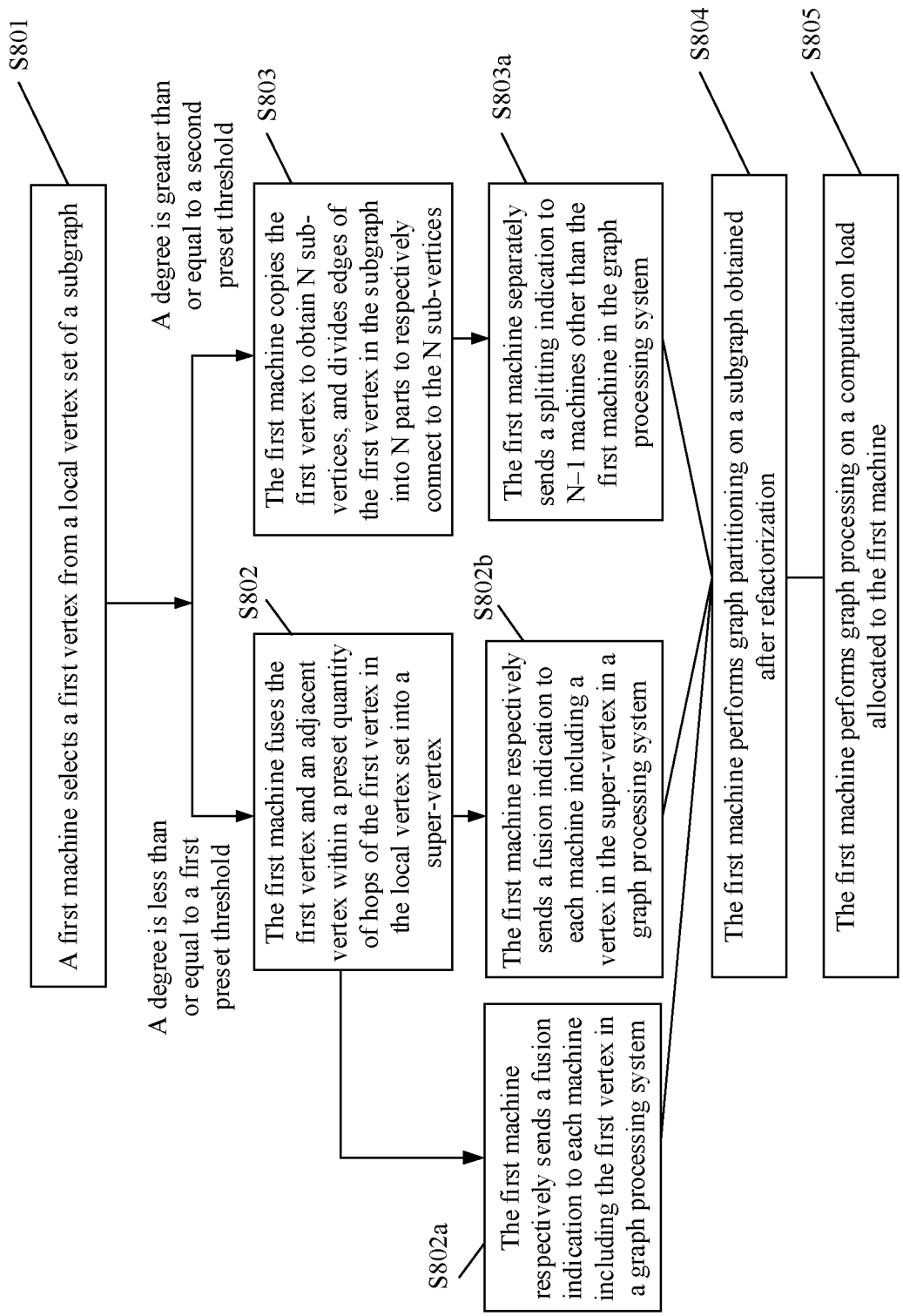
FIG. 10 is a schematic flowchart of another graph refactorization method according to an embodiment of this disclosure.

Further, as shown in FIG. 10, if the first machine performs S802, the graph refactorization method provided in this embodiment of this disclosure may further include S802*a* or S802*b*.

S802*a*: The first machine respectively sends a fusion indication to each machine including the first vertex in a graph processing system.

The fusion indication may include an identifier of the first vertex, and the fusion indication is used to mark that the first machine has performed a fusion operation on the first vertex.

S802*b*: The first machine respectively sends a fusion indication to each machine including a vertex in the super-vertex in a graph processing system.

The fusion indication includes a vertex identifier of the super-vertex included in a target machine, to mark that the first machine has performed a fusion operation on the vertex in the super-vertex.

For example, the first machine may perform transmission communication with another machine by using the transmission control protocol (TCP). Certainly, the first machine may alternatively communicate with another machine by using another protocol. This is not specifically limited in this disclosure.

It should be noted that an execution sequence of S802*a*, S802*b*, and S802 is not limited. FIG. 10 only shows an example.

S803: The first machine copies the first vertex to obtain N sub-vertices, and divides edges of the first vertex in the subgraph into N parts to respectively connect to the N sub-vertices.

N is less than or equal to a total quantity of machines included in the graph processing system to which the first machine belongs.

Specifically, in S803, the dividing edges of the first vertex in the subgraph into N parts may be specifically implemented as: if a quantity of edges of the first vertex in the subgraph is an integer multiple of N, equally dividing the edges of the first vertex into N parts; and if the quantity of edges of the first vertex in the subgraph is not an integer multiple of N, dividing the edges of the first vertex into N parts, where a quantity of edges of each part is an integer, and a difference between quantities of edges of every two parts is the smallest.

For example, assuming that the quantity of edges of the first vertex in the subgraph is 8, and N is 4, in S803, the edges of the first vertex are equally divided into four parts, and each part has two edges.

For example, assuming that the quantity of edges of the first vertex in the subgraph is 13, and N is 4, in S803, the edges of the first vertex are divided into four parts, and the four parts respectively have three edges, three edges, three edges, and four edges.

Further, after S803 is performed, the local vertex set of the first machine does not include the first vertex.

Further, as shown in FIG. 10, if the first machine performs S803, the graph refactorization method provided in this embodiment of this disclosure may further include S803a.

S803a: The first machine separately sends a splitting indication to N−1 machines other than the first machine in the graph processing system.

The splitting indication may include the identifier of the first vertex, and the splitting indication is used to mark that the first machine has performed a splitting operation on the first vertex.

It should be noted that an execution sequence of S803a and S803 is not limited. FIG. 10 only shows an example.

According to the graph refactorization method provided in this disclosure, based on degrees of vertices in a subgraph of a machine, a low-degree vertex is fused, and a high-degree vertex is split, to ensure that degrees in a graph obtained after refactorization are equivalent on the premise of retaining an original topological structure of graph structure data. In this way, graph partitioning is performed on the graph obtained after refactorization during parallel graph processing. While a computation load allocated to each machine is balanced, because the original topological structure is retained, there is no need for excessive communication between different machines. In this way, execution time of subsequent graph processing is shortened.

Further, as shown in FIG. 10, the graph refactorization method provided in this embodiment of this disclosure may further include S804 and S805.

S804: The first machine performs graph partitioning on a subgraph obtained after refactorization.

Specifically, existing graph partitioning methods, such as edge-cut, vertex-cut, or hybrid-cut, are supported in S804. In S804, a more efficient graph partitioning algorithm, such as a hybrid-bregel (Hybrid-BL) algorithm, is further used. The hybrid-BL algorithm is based on a hybrid-cut principle. In the algorithm, a super-vertex and a sub-vertex are directly allocated to a corresponding machine based on load information of a local machine, thereby avoiding global coordination overheads.

For example, specific content of the hybrid-BL algorithm may include: The first machine allocates the super-vertex and an edge of the super-vertex to a machine having a smallest load in the graph processing system as a computation load. Alternatively, the first machine allocates a sub-vertex and an edge of the sub-vertex to the first machine as a computation load, and the first machine respectively allocates N−1 sub-vertices other than the sub-vertex and edges of the N−1 sub-vertices to N−1 machines other than the first machine in the graph processing system as computation loads.

S805: The first machine performs graph processing on the computation load allocated to the first machine.

In S805, the first machine may perform, based on a standard GAS model, graph processing on a computation load distributed to each machine. Alternatively, in S805, the first machine may perform, based on a delta-based D-GAS model, graph processing on a graph satisfying an Abelian group (Abelian group) condition.

The graph refactorization method provided in this disclosure is described below by using specific examples.

Figure 11:
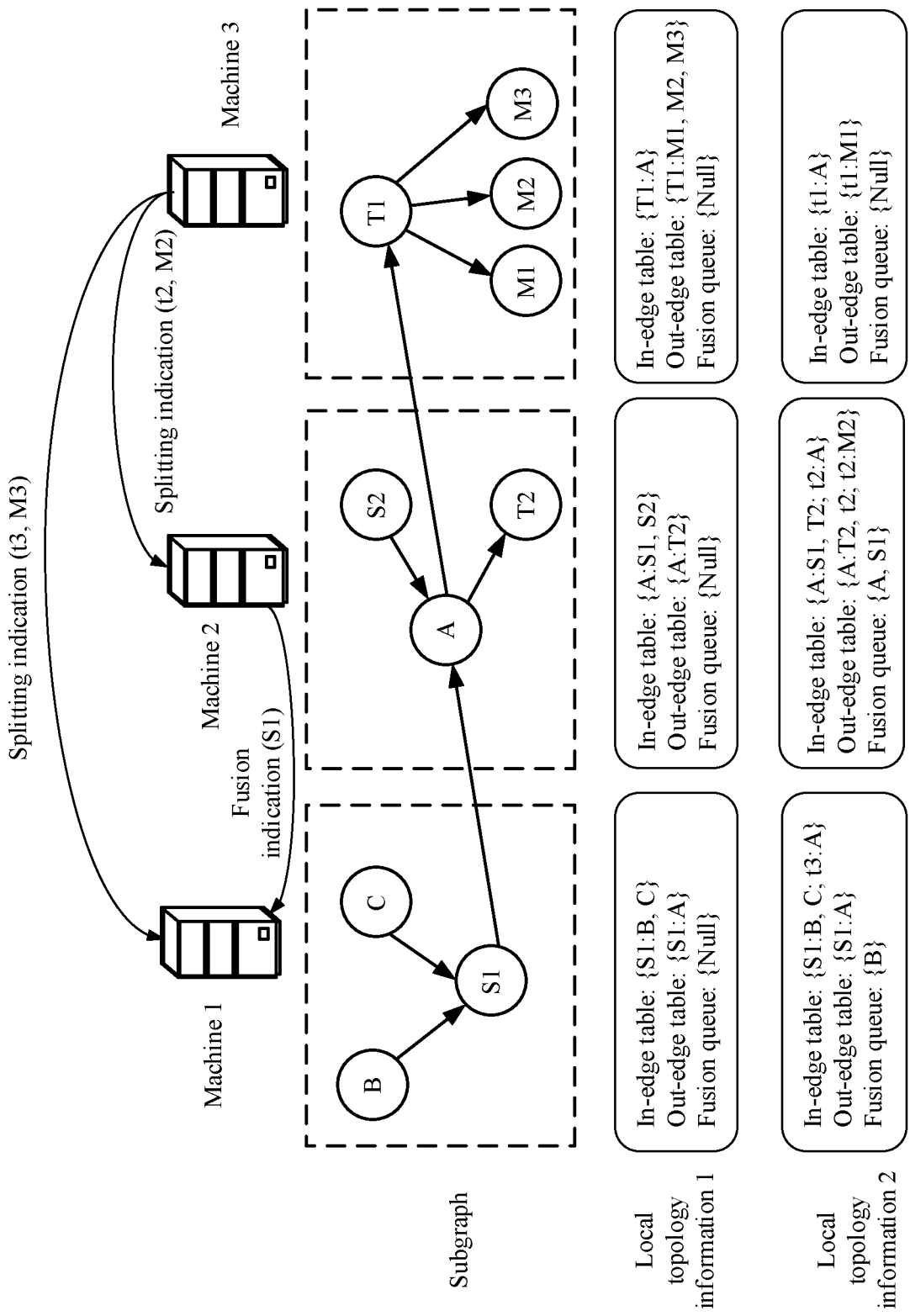
FIG. 11 is a schematic diagram of an disclosure scenario according to an embodiment of this disclosure.

As a schematic diagram of an application scenario shown in FIG. 11, a graph processing system includes three machines, respectively recorded as a machine 1, a machine 2, and a machine 3, and respective subgraphs and local topology information of the machines are shown as local topology information 1 in FIG. 11.

The machine 1 performs the graph refactorization method in this disclosure, and adds a vertex B to a fusion queue as a to-be-fused node. The machine 2 performs the graph refactorization method in this disclosure, adds a vertex A and a vertex S1 to the fusion queue as to-be-fused nodes, and sends a fusion indication to the machine 1, to prevent the machine 1 from fusing the vertex S1. The machine 3 performs the graph refactorization method in this disclosure, performs a splitting operation on a vertex T1, splits the vertex T1 into t1, t2, and t3 to respectively connect to M1, M2, and M3, and separately sends a splitting indication to the machine 1 and the machine 2. Then, local topology information of the machine 1, the machine 2, and the machine 3 is shown as local topology information 2 in FIG. 11, and subgraphs of the machine 1, the machine 2, and the machine 3 are refactored.

It should be noted that the foregoing example merely describes a process of performing graph refactorization on a part of graphs in the graph structure data by way of example. In an actual application, a scale of the graph structure data is large, and refactorization can be completed by cyclically performing the graph refactorization method in this disclosure. The refactorization process is not described in detail in this embodiment of this disclosure.

The solutions of this disclosure greatly avoid an unbalanced load and excessively high communication costs caused by a graph partitioning operation, shorten execution time of graph processing, and can shorten execution time by as much as 78.5% in a simulation test. A simulation experiment is carried out for the solutions of this disclosure by using a cloud computing simulation platform, and used dataset information is shown in following Table 1.

TABLE 1

| Datasets | Quantity of edges | Quantity of vertices | Graph type |
| --- | --- | --- | --- |
| Dataset 1 | 3.74 B | 105.9 M | Power-law (Power-law) |
| Dataset 2 | 1.46 B | 41.6 M | Heavy-tailed (Heavy-tailed) |
| Dataset 3 | 298.1 M | 18.5 M | Power-law (Power-law) |
| Dataset 4 | 120.8 M | 10 M | Power-law (Power-law) |
| Dataset 5 | 57.1 M | 10 M | Power-law (Power-law) |
| Dataset 6 | 35.0 M | 10 M | Power-law (Power-law) |
| Dataset 7 | 44.8 M | 18.0 M | Non-skewed (Non-skewed) |

Different datasets in Table 1 are simulated in two different clusters. The two clusters are described as follows:

EC2 cluster: The ECS cluster includes 48 machines. Each machine has 8 Xeon E5-2676 v3 vCPUs, a 16 gigabyte (GB) memory, and a 256 GB solid-state disk. The datasets simulated in the cluster are the dataset 1 and the dataset 2.

Local cluster: The local cluster includes nine machines. Each machine has a 6-core E5-2640 CPU, a 32 GB memory, and has a network hard disk of a 1 gigabit per second (Gbps) network interface controller (NIC). The datasets simulated in the cluster are the dataset 3, the dataset 4, the dataset 5, the dataset 6, and the dataset 7.

Evaluation is performed from the following three aspects: overall performance, graph partitioning costs (graph partitioning costs in this disclosure include topology refactorization costs), and graph processing performance. A comparison objective of simulation is to run a pagerank (PR) algorithm and a connected components (CC) algorithm to compare with a PowerGraph (PG) algorithm, a PowerLyra (PL) algorithm, and a Blogel-Hybrid (BH) algorithm in the existing technology. In the following simulation result, a process of performing graph processing by using the solutions of this disclosure and the GAS model is recorded as Topox, and a process of performing graph processing by using the solutions of this disclosure and the D-GAS model is recorded as Topox (D-GAS).

Figure 12A:
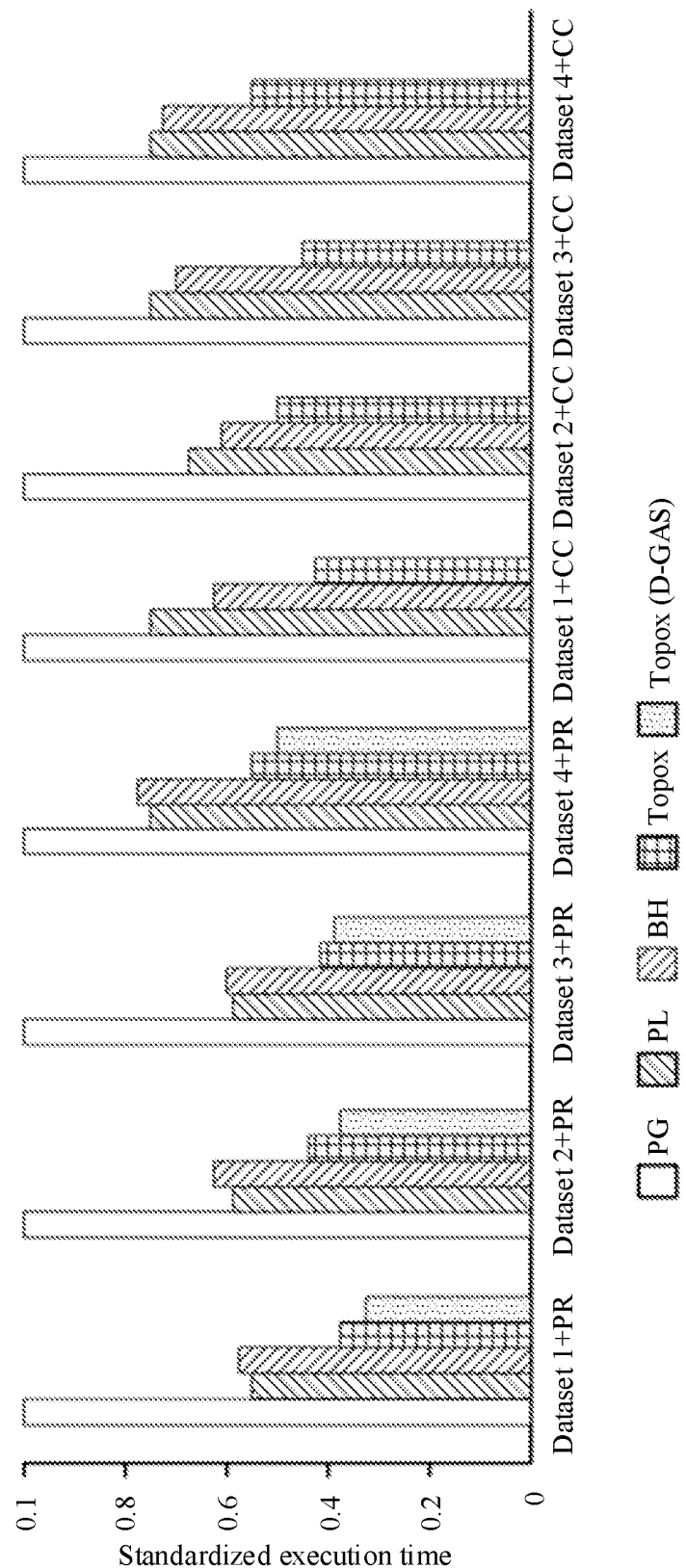
FIG. 12a is a schematic diagram of a simulation result of standardized execution time according to an embodiment of this disclosure.
Figure 12B:
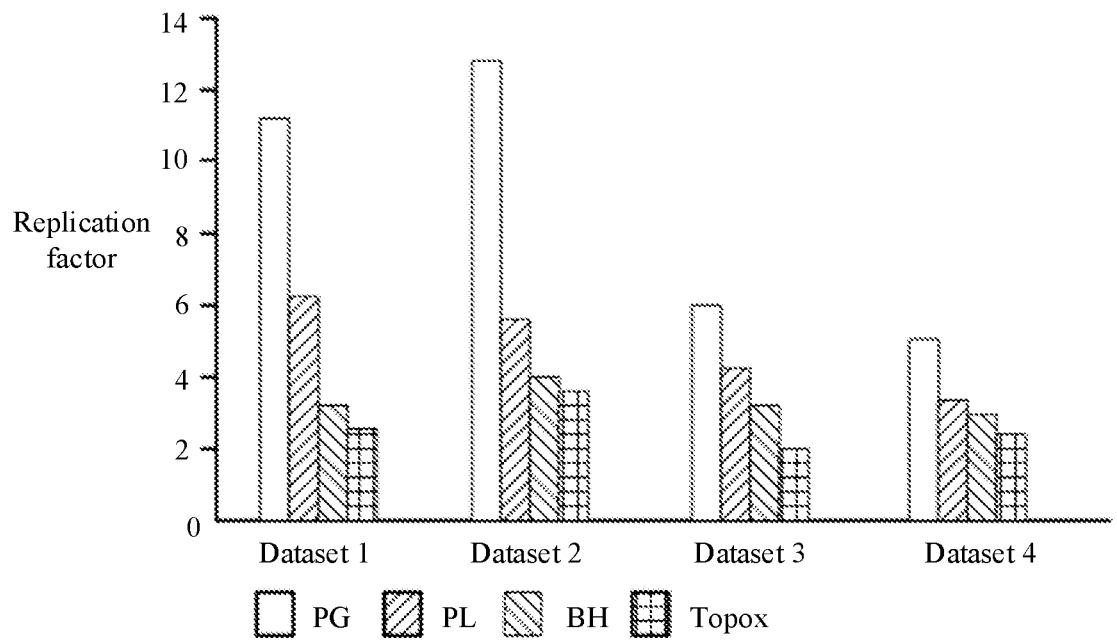
FIG. 12b is a schematic diagram of a simulation result of a replication factor according to an embodiment of this disclosure.
Figure 12C:
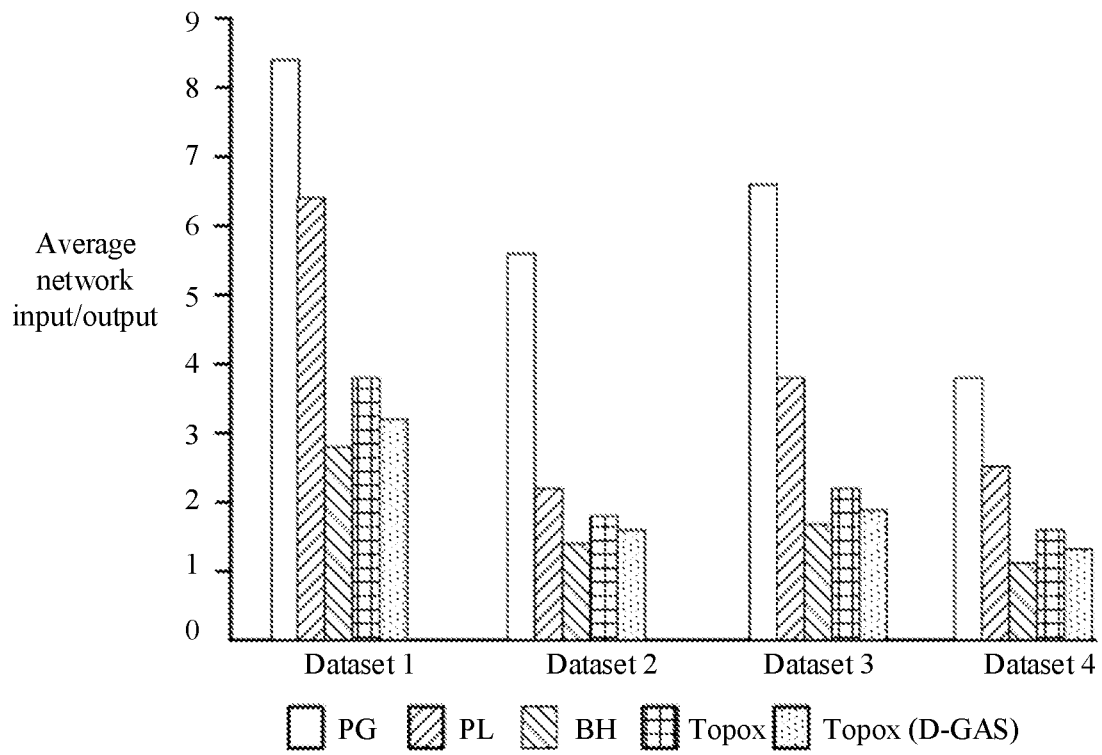
FIG. 12c is a schematic diagram of simulation of an average network input/output capacity according to an embodiment of this disclosure.

Comparison results of the overall performance are shown in FIG. 12a to FIG. 12c. FIG. 12a is a schematic diagram of a simulation result of standardized execution time, FIG. 12b is a schematic diagram of a simulation result of a replication factor, and FIG. 12c is a schematic diagram of a simulation result of an average network input/output capacity (unit: GB). As shown in FIG. 12a to FIG. 12c, overall execution time in the solutions of this application is the shortest, and a smallest quantity of replication factors is needed, reflecting lower communication costs.

Figure 13:
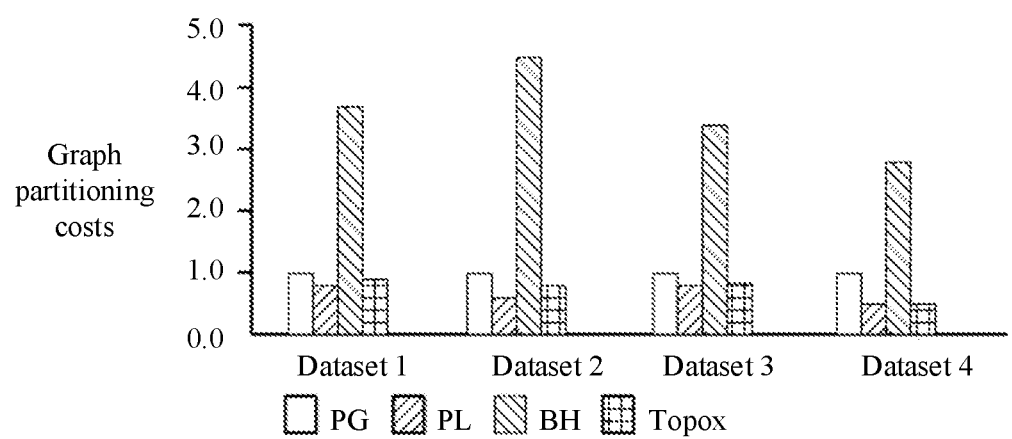
FIG. 13 is a schematic diagram of a comparison effect of graph partitioning computation costs according to an embodiment of this disclosure.

The comparison effect of the graph partitioning computation costs is shown in FIG. 13. Entry time in the solutions of this application is very close to that in a PL technology. Compared with that in PG and BH, entry time in the solutions of this application and entry time in the PL technology are greatly reduced, reflecting a low latency of a graph processing step.

Figure 14:
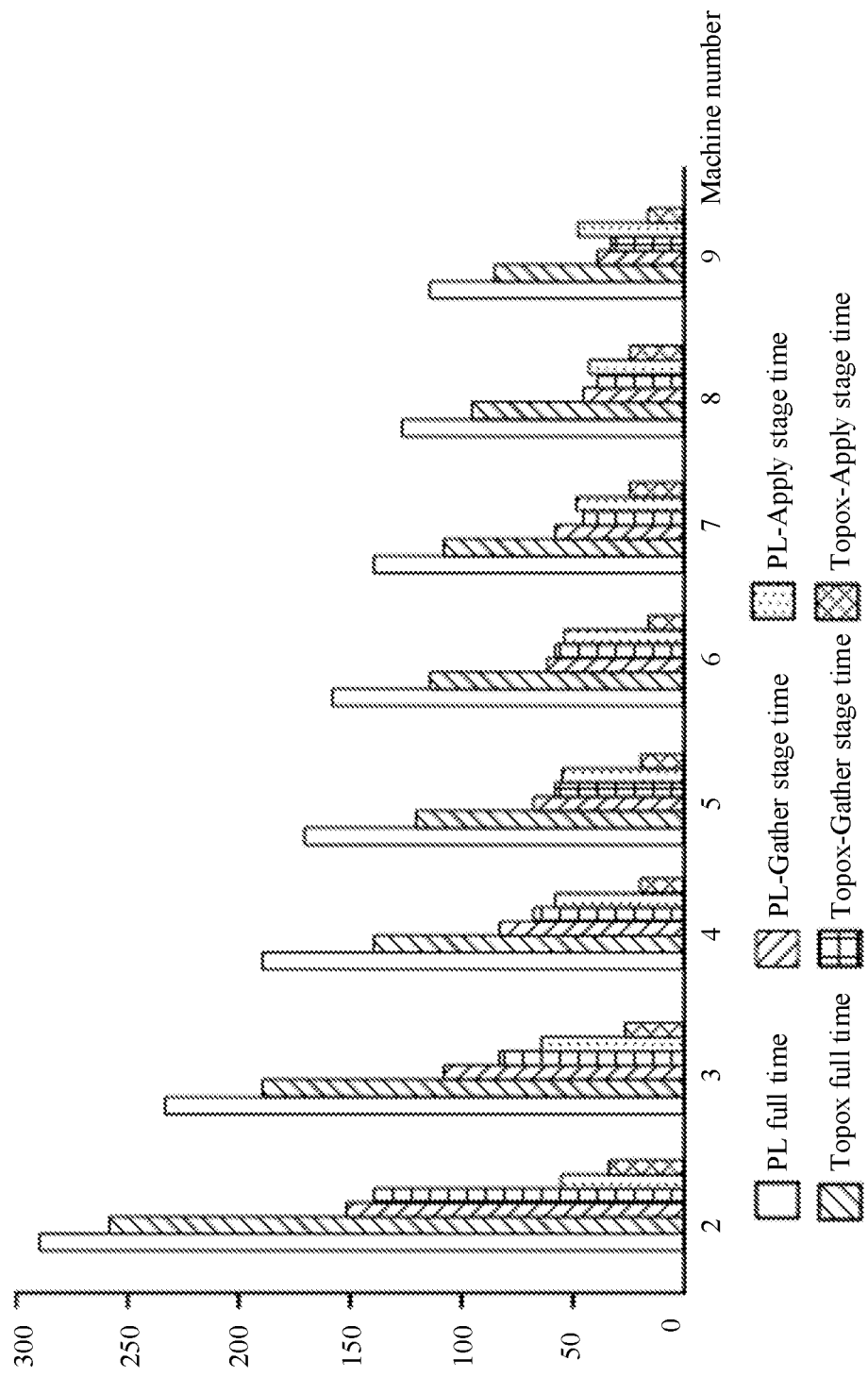
FIG. 14 is a schematic diagram of a comparison effect of execution time of graph processing according to an embodiment of this disclosure.

The comparison effect of the execution time of graph processing is shown in FIG. 14. Compared with execution time on the whole of the GAS model or on each module in the PL technology, time needed by the solutions of this application is shorter.

The foregoing mainly describes the solutions provided in the embodiments of this disclosure from a perspective of a working principle of the first machine. It may be understood that to implement the foregoing functions, the foregoing first device includes corresponding hardware structures and/or software modules for performing various functions. Functional units that implement the graph refactorization method in the first machine are referred to as a graph refactorization apparatus. Persons skilled in the art should be easily aware that, in combination with units and algorithm steps of the examples described in the embodiments disclosed in this specification, this disclosure may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this disclosure.

In the embodiments of this disclosure, a refactorization apparatus may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, in the embodiments of this disclosure, division into the modules is an example, and is merely a logical function division. Another division manner may be used in an actual implementation.

Figure 15:
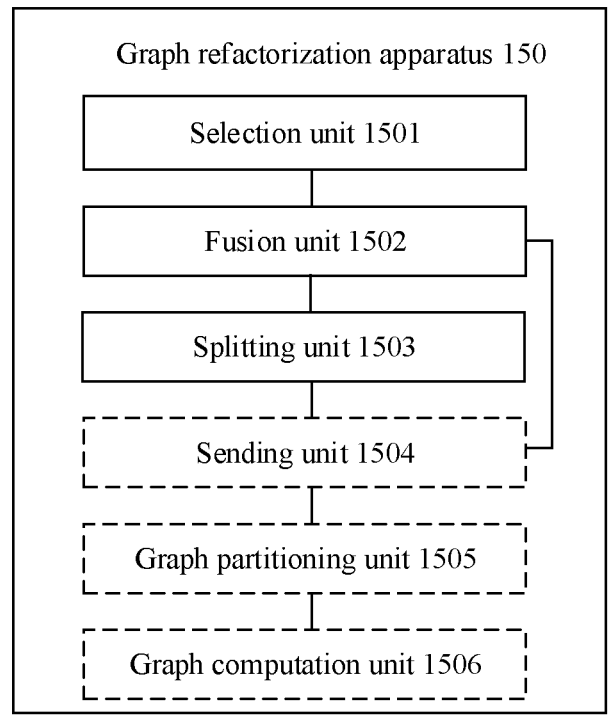
FIG. 15 is a schematic diagram of a structure of another graph refactorization apparatus according to an embodiment of this disclosure.

When each functional module is obtained through division by using each corresponding function, FIG. 15 is an optional schematic diagram of a structure of a graph refactorization apparatus 150 deployed in the first machine in the foregoing embodiment. The graph refactorization apparatus 150 may be the first machine itself, or a functional module or a chip in the first machine, or an apparatus used in cooperation with the first machine. As shown in FIG. 15, the graph refactorization apparatus 150 may include a selection unit 1501, a fusion unit 1502, and a splitting unit 1503. The selection unit 1501 is configured to perform process S801 in FIG. 8. The fusion unit 1502 is configured to perform process S802 in FIG. 8. The splitting unit 1503 is configured to perform process S803 in FIG. 8. All related content of the steps in the foregoing method embodiments may be cited in function description of corresponding functional modules. Details are not described herein again.

Further, as shown in FIG. 15, the graph refactorization apparatus 150 may include a sending unit 1504, a graph partitioning unit 1505, and a graph computation unit 1506. The sending unit 1504 is configured to perform processes S802a, S802b, and S803a in FIG. 10. The graph partitioning unit 1505 is configured to perform process S804 in FIG. 10. The graph computation unit 1506 is configured to perform process S805 in FIG. 10.

Figure 16:
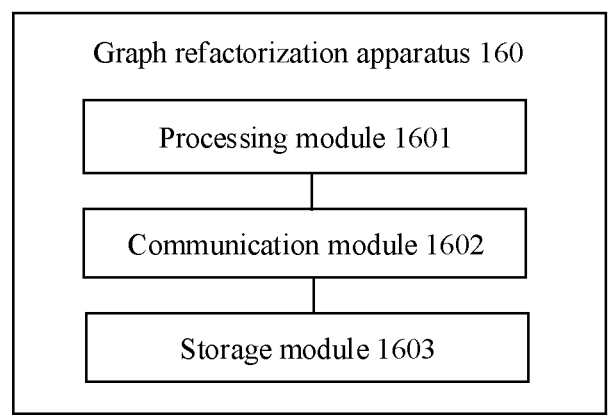
FIG. 16 is a schematic diagram of a structure of another graph refactorization apparatus according to an embodiment of this disclosure.

When integrated units are used, FIG. 16 is an optional schematic diagram of a structure of a graph refactorization apparatus 160 deployed in the first machine in the foregoing embodiment. The graph refactorization apparatus 160 may be the first machine itself, or a functional module or a chip in the first machine, or an apparatus used in cooperation with the first machine. The graph refactorization apparatus 160 may include a processing module 1601 and a communication module 1602. The processing module 1601 is configured to control and manage actions of the graph refactorization apparatus 160. For example, the processing module 1601 is configured to perform processes S801, S802, and S803 in FIG. 8 and processes S804 and S805 in FIG. 10. The processing module 1601 is further configured to perform processes S802a, S802b, and S803a in FIG. 10 by using the communication module 1602. The graph refactorization apparatus 160 may further include a storage module 1603, configured to store program code and data of the graph refactorization apparatus 160.

The processing module 1601 may be the processor 601 in a physical structure of the graph refactorization apparatus 60 shown in FIG. 6, and may be a processor or a controller. For example, the processing module may be a CPU, a general purpose processor, a DSP, an ASIC, an FPGA or another programmable logic device, a transistor logic device, a hardware component, or any combination thereof. The processor may implement or execute various examples of logical blocks, modules, and circuits described with reference to the content disclosed in this disclosure. Alternatively, the processor 601 may be a combination of processors implementing a computing function, for example, a combination of one or more microprocessors, or a combination of the DSP and a microprocessor. The communication module 1602 may be the transceiver 603 in a physical structure of the graph refactorization apparatus 60 shown in FIG. 6, and the communication module 1602 may be a communication port, or may be a transceiver, a transceiver circuit, a communication interface, or the like. Alternatively, the communication interface may communicate with another device by using the foregoing element that has receiving and sending functions. The foregoing element that has receiving and sending functions may be implemented through an antenna and/or a radio frequency apparatus. The storage module 1603 may be the memory 602 in a physical structure of the graph refactorization apparatus 60 shown in FIG. 6.

When the processing module 1601 is a processor, the communication module 1602 is a transceiver, and the storage module 1603 is a memory, the graph refactorization apparatus 160 in FIG. 16 in the embodiments of this disclosure may be the graph refactorization apparatus 60 shown in FIG. 6.

As described above, the graph refactorization apparatus 150 or the graph refactorization apparatus 160 provided in the embodiments of this disclosure may be configured to implement functions of the first machine in the methods implemented in the foregoing embodiments of this disclosure. For ease of description, only a part related to the embodiments of this disclosure is shown. For specific technical details that are not disclosed, refer to the embodiments of this disclosure.

In another form of this embodiment, an embodiment of this disclosure provides a machine, including the graph refactorization apparatus 150 or the graph refactorization apparatus 160.

In another form of this embodiment, an embodiment of this disclosure provides a graph processing system, including two or more machines. The machine includes the graph refactorization apparatus 150 or the graph refactorization apparatus 160.

In another form of this embodiment, a computer readable storage medium is provided. Instructions are stored on the computer readable storage medium. When the instructions are executed, the graph refactorization method in the foregoing method embodiments is performed.

In another form of this embodiment, a computer program product including instructions is provided. When the instructions are executed, the graph refactorization method in the foregoing method embodiments is performed.

It may be clearly understood by persons skilled in the art that, for purpose of convenient and brief description, for a detailed working process of the foregoing system, apparatus, and unit, refer to a corresponding process in the foregoing method embodiments, and details are not described herein again.

Persons skilled in the art should be aware that in one or more of the foregoing examples, the functions described in this disclosure may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a special-purpose computer. It may be clearly understood by persons skilled in the art that, for purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of this disclosure. The foregoing storage medium includes any medium, for example, a USB flash drive, a removable hard disk, a read-only memory (ROM), a random access memory (RAM), a magnetic disk, or an optical disc, that can store program code.

Finally, it should be noted that the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this disclosure.

What is claimed is:

1. A graph refactorization method, comprising:
    selecting, by a first machine, a first vertex from a local vertex set of a subgraph, wherein the local vertex set comprises all unrefactored vertices in the subgraph, and the first vertex is any vertex in the local vertex set;
    if a degree of the first vertex is less than or equal to a first preset threshold, fusing, by the first machine, the first vertex and a vertex within a preset quantity of hops of the first vertex in the local vertex set into a super-vertex; and
    if the degree of the first vertex is greater than or equal to a second preset threshold, copying, by the first machine, the first vertex to obtain N sub-vertices, and dividing, by the first machine, edges of the first vertex in the subgraph into N parts to respectively connect to the N sub-vertices, wherein N is less than or equal to a total quantity of machines comprised in a graph processing system to which the first machine belongs, wherein at least one of the degree of the first vertex is less than or equal to the first preset threshold or the degree of the first vertex is treater than or equal to the second threshold.

2. The method according to claim 1, wherein the degree of the first vertex is less than or equal to the first preset threshold, and the method further comprises:
respectively sending, by the first machine, a fusion indication to each machine comprising the first vertex in the graph processing system, to mark that the first machine has performed a fusion operation on the first vertex.

3. The method according to claim 1, wherein the degree of the first vertex is greater than or equal to the second preset threshold, and the method further comprises:
separately sending, by the first machine, a splitting indication to N−1 machines other than the first machine in the graph processing system, to mark that the first machine has performed a splitting operation on the first vertex.

4. The method according to claim 1, wherein the method further comprises:
performing, by the first machine, graph partitioning on a subgraph obtained after refactorization; and
performing, by the first machine, graph processing on a computation load allocated to the first machine.

5. The method according to claim 4, wherein the performing, by the first machine, graph partitioning on a subgraph obtained after refactorization comprises:
allocating, by the first machine, the super-vertex and an edge of the super-vertex to a machine having a smallest load in the graph processing system as a computation load; or, allocating, by the first machine, a sub-vertex and an edge of the sub-vertex to the first machine as a computation load, and respectively allocating, by the first machine, N−1 sub-vertices other than the sub-vertex and edges of the N−1 sub-vertices to N−1 machines other than the first machine in the graph processing system as computation loads.

6. The method according to claim 4, wherein the performing, by the first machine, graph processing on a computation load allocated to the first machine comprises:
performing, by the first machine, delta-based graph processing on the computation load allocated to the first machine.

7. The method according to claim 1, wherein the degree of the first vertex is greater than or equal to the second preset threshold and the dividing edges of the first vertex in the subgraph into N parts comprises:
if a quantity of edges of the first vertex in the subgraph is an integer multiple of N, equally dividing the edges of the first vertex into N parts; and
if the quantity of edges of the first vertex in the subgraph is not an integer multiple of N, dividing the edges of the first vertex into N parts, wherein a quantity of edges of each part is an integer, and a difference between quantities of edges of every two parts is the smallest.

8. A first machine comprising:
a memory storing executable instructions;
a processor configured to execute the executable instructions to perform operations of:
selecting a first vertex from a local vertex set of a subgraph, wherein the local vertex set comprises all unrefactored vertices in the subgraph, and the first vertex is any vertex in the local vertex set;
if a degree of the first vertex is less than or equal to a first preset threshold, fusing the first vertex and a vertex within a preset quantity of hops of the first vertex in the local vertex set into a super-vertex; and
if the degree of the first vertex is greater than or equal to a second preset threshold, copying the first vertex to obtain N sub-vertices, and dividing edges of the first vertex in the subgraph into N parts to respectively connect to the N sub-vertices, wherein N is less than or equal to a total quantity of machines comprised in a graph processing system.

9. The first machine according to claim 8, wherein the processor is further configured to execute the executable instructions to perform the operations of:
if the degree of the first vertex is less than or equal to the first preset threshold, respectively sending a fusion indication to each machine comprising the first vertex in the graph processing system, to mark that the first machine has performed a fusion operation on the first vertex.

10. The first machine according to claim 8, wherein the processor is further configured to execute the executable instructions to perform the operations of:
if the degree of the first vertex is greater than or equal to the second preset threshold, separately sending a splitting indication to N−1 machines other than the first machine in the graph processing system, to mark that the first machine has performed a splitting operation on the first vertex.

11. The first machine according to claim 8, wherein the processor is further configured to execute the executable instructions to perform the operations of:
performing graph partitioning on a subgraph obtained after refactorization; and
performing graph processing on a computation load allocated to the first machine.

12. The first machine according to claim 11, wherein the performing graph partitioning on a subgraph obtained after refactorization comprises:
allocating the super-vertex and an edge of the super-vertex to a machine having a smallest load in the graph processing system as a computation load; or, allocating a sub-vertex and an edge of the sub-vertex to the first machine as a computation load, and respectively allocating N−1 sub-vertices other than the sub-vertex and edges of the N−1 sub-vertices to N−1 machines other than the first machine in the graph processing system as computation loads.

13. The first machine according to claim 11, wherein the performing graph processing on a computation load allocated to the first machine comprises:
performing delta-based graph processing on the computation load allocated to the first machine.

14. The first machine according to claim 8, wherein the dividing edges of the first vertex in the subgraph into N parts comprises:
if a quantity of edges of the first vertex in the subgraph is an integer multiple of N, equally dividing the edges of the first vertex into N parts; and
if the quantity of edges of the first vertex in the subgraph is not an integer multiple of N, dividing the edges of the first vertex into N parts, wherein a quantity of edges of each part is an integer, and a difference between quantities of edges of every two parts is the smallest.

15. A non-transitory computer readable storage medium, comprising instructions, wherein when the instructions are run on a computer, the computer is enabled to perform the following operations:

selecting, by a first machine, a first vertex from a local vertex set of a subgraph, wherein the local vertex set comprises all unrefactored vertices in the subgraph, and the first vertex is any vertex in the local vertex set;

if a degree of the first vertex is less than or equal to a first preset threshold, fusing, by the first machine, the first vertex and a vertex within a preset quantity of hops of the first vertex in the local vertex set into a super-vertex; and if the degree of the first vertex is greater than or equal to a second preset threshold, copying, by the first machine, the first vertex to obtain N sub-vertices, and dividing edges of the first vertex in the subgraph into N parts to respectively connect to the N sub-vertices, wherein N is less than or equal to a total quantity of machines comprised in a graph processing system to which the first machine belongs.

* * * * *